C. C. CARPENTER.
STORAGE BATTERY PLATE.
APPLICATION FILED AUG. 3, 1917. RENEWED MAY 19, 1920.

1,416,788. Patented May 23, 1922.

WITNESS:
Fay E. Bronk.
Ralph Munden

INVENTOR.
Campbell C. Carpenter.
BY
Raymund H Von West
ATTORNEY.

UNITED STATES PATENT OFFICE.

CAMPBELL C. CARPENTER, OF NIAGARA FALLS, NEW YORK, ASSIGNOR TO U. S. LIGHT & HEAT CORPORATION, OF NIAGARA FALLS, NEW YORK, A CORPORATION OF NEW YORK.

STORAGE-BATTERY PLATE.

1,416,788.  Specification of Letters Patent.  Patented May 23, 1922.

Application filed August 3, 1917, Serial No. 184,219. Renewed May 19, 1920. Serial No. 382,644.

*To all whom it may concern:*

Be it known that I, CAMPBELL C. CARPENTER, a citizen of the United States, residing at Niagara Falls, in the county of Niagara and State of New York, have invented new and useful Improvements in Storage-Battery Plates, of which the following is a specification.

The present invention relates to storage battery plates.

More particularly the invention relates to storage battery plates so constructed that when assembled in a cell, the likelihood of treeing across from a plate of one polarity to an adjacent plate of opposite polarity is very much reduced.

An object of the present invention is to provide a plate which, when assembled in a group with other plates, will prevent treeing across from plate to plate.

A further object is to provide a plate which may be of large size and which will automatically centralize itself between the battery walls.

Further objects will be apparent as the description proceeds.

Referring to the drawings.

Figures 1, 2:
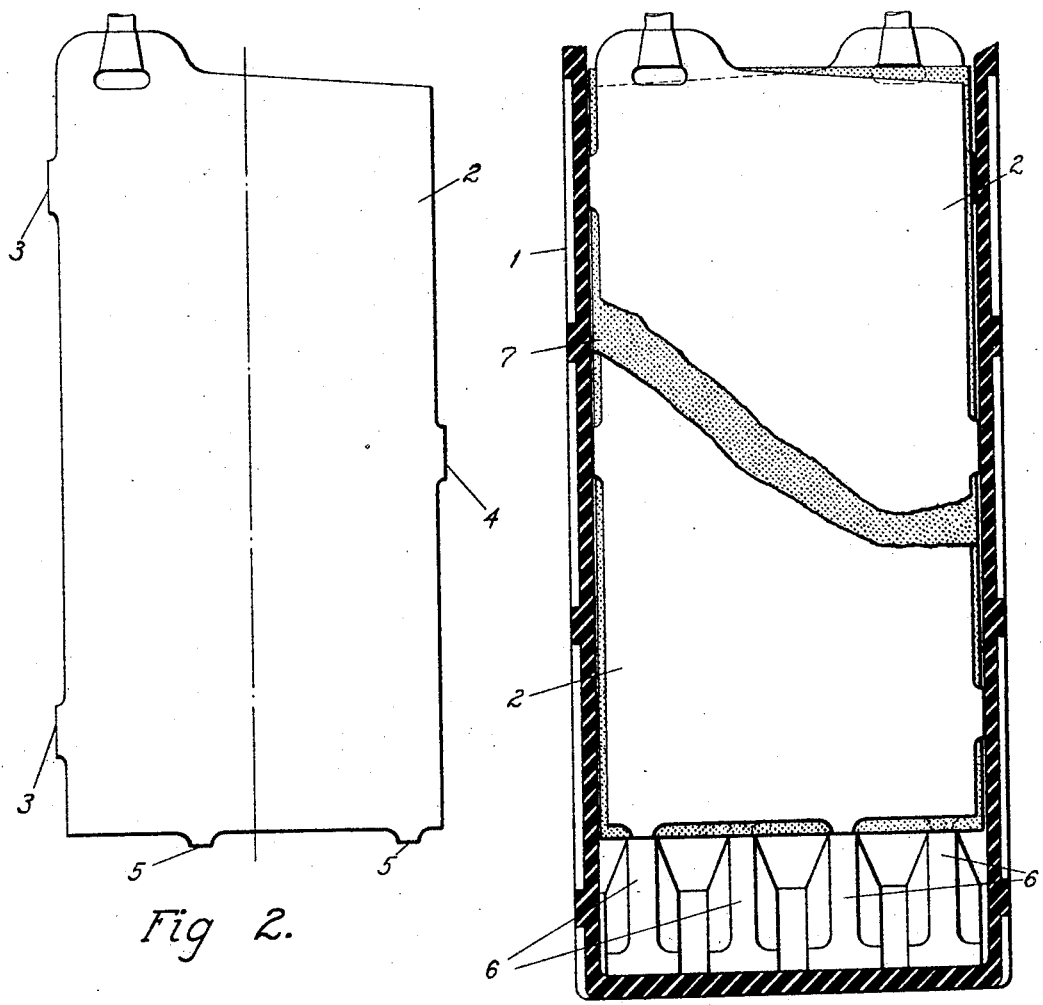
Fig. 1 represents in sectional elevation a view of a storage battery cell illustrating plates according to the present invention.
Fig. 2 represents a storage battery plate according to the present invention.

The jar of a storage battery is indicated by the numeral 1. Said jars are commonly of rectangular outline having parallel walls. The improved plate, according to the present invention, is indicated by the numeral 2. Arranged along one edge of said storage battery plate are a pair of projections 3, 3. On the opposite edge of said plate is a projection 4 which may be similar in outline to the projections 3, 3, but is out of line therewith. The bottom edge of the plate is provided with projections 5, 5, unsymmetrically arranged with the vertical center line of said plate. Said projections 5, 5, are adapted to rest upon alternate bridges 6, 6, in the bottom of the cell. Reversely placed plates will also have their projections 5, 5, resting upon alternate bridges 6, 6, said latter alternate bridges being intermediate of the first mentioned alternate bridges.

Both positive and negative plates will preferably have the same configuration but when assembled in groups in the storage battery, will be placed reversely, whereby the projections 3, 3, of all the plates of one polarity will contact with one side wall of the battery jar and the projections 4, 4, of each of the plates of opposite polarity will contact with the same side wall.

Separators 7 are placed between adjacent plates, thereby separating plates of opposite polarity. It is common practice to have the separators 7 of greater width than the storage battery plates, whereby the separators will extend beyond the sides of the plates on both sides of the jar, whereby to reduce treeing.

With the plates constructed according to the present invention, arranged as described above, the lugs 3, 3, and 4, 4, will hold each plate in a central position relative to the jar and the separators.

No projections of any plate will be adjacent to a projection of a plate of opposite polarity. Therefore, if any sediment should collect at any point along the walls of the jar, said sediment will not cause a short circuit.

It will be clear that by the present invention large plates may be securely held against lateral shifting within the jar and that short-circuiting between adjacent plates of opposite polarity will be prevented. Any preferred means may be provided for holding the separators 7 against vertical movement.

One embodiment of the present invention has been described in detail. Many modifications will occur to those skilled in the art. It is intended in this patent to cover all such modifications that come within the scope of the invention as defined by the appended claims.

What I claim as new and desire to secure by Letters Patent of the United States, is—

1. In combination, a battery jar, battery plates in said jar, the general outline of said plates being less in width than the corresponding dimension of the inside of said jar, each of said plates being provided with wall abutting projections on its side edges adjacent the side walls of said jar, whereby to prevent lateral shifting of said plates within said jar.

2. A battery plate having side edges which are provided with projections, the projections on opposite edges being unsymmetrically arranged with one another.

3. In combination, a battery jar, battery plates in said jar, the general outline of said plates being less in width than the corresponding dimension of the inside of said jar, each of said plates being provided with wall abutting projections on its side edges, the projections on opposite edges being unsymmetrically arranged and the positive and negative plates being reversely arranged, whereby projections on adjacent plates are unadjacent.

4. In a battery jar, in combination, positive and negative plates each having projecting means for preventing lateral movement relative to said jar, said means on said positive plates being unadjacent to said means on said negative plates.

5. A battery plate having side edges, a projection in the plane of the plate substantially centrally placed on one of said edges, and projections in the plane of the plate symmetrically displaced from the center of the opposite edge.

6. In combination, a battery jar, battery plates within said jar, the bottom of said jar being provided with bridges upon which said plates are adapted to rest, plates of opposite polarity being of the same outline but reversely placed in said jar, the bottom edges of each of said plates being provided with a bridge-engaging projection offset from the vertical center line of said plate, whereby projections on plates of opposite polarity lie in different lines, said bridges being located to engage said projections.

7. In combination, a battery jar, battery plates within said jar, each of said plates being provided with projections along three edges whereby to position said plate relative to three sides of said jar, projections on adjacent plates being unadjacent.

8. A battery plate of substantially rectangular outline, three of its edges having projecting means, the projecting means of one edge being arranged in alternate relation to the projecting means on the opposite edge and the projecting means on the third edge being unsymmetrically arranged relative to the center line of said plate.

9. In combination, a battery jar, battery plates within said jar, each of said plates being provided with projections along three edges whereby to position said plate relative to three sides of said jar, projections on adjacent plates being unadjacent, plates of opposite polarities being of the same outline and reversely arranged in said jar.

10. In combination, a battery jar, battery plates, each of said plates being provided with extensions on its bottom edge, extensions on adjacent plates being unadjacent, plates of opposite polarities being of the same general outline and reversely placed in said jar.

11. In combination, a battery jar provided with plate supporting bridges, battery plates supported on said bridges, each of said plates having part of its lower edge cut away to avoid certain of said bridges, the plates of opposite polarities being of the same general outline and reversely placed in said jar, the cut-away parts being unsymmetrically arranged relative to the center lines of said plates.

12. In combination, a battery jar provided with plate supporting bridges, battery plates, each of said plates being provided with bridge engaging projections unsymmetrically placed relative to the vertical center line of said plate, the plates of one polarity having its projections similarly placed to those of the opposite polarity, said plates being reversely placed in said jar, whereby the projections on plates of one polarity lie in a different line from the projections on the plates of the opposite polarity.

13. In a battery jar, in combination, battery plates each having feet unsymmetrically placed relative to the vertical center line of said plate, the plates on one polarity having its feet similarly placed to those of plates of the opposite polarity, said plates being reversely placed in said jar.

14. In a storage battery cell, the combination of a container, positive and negative plates therein, means whereby said plates are combined in the form of a unit, and spaced bridges in said container whereby said unit is maintained in position, the supporting edges of said plates having portions extendingly downwardly beyond contiguous portions of said plates, the latter being set in reversed relation to each other in said cell whereby said plates are in engagement with one bridge and spaced from the other bridge.

15. In a storage battery cell, the combination of a container, plates therein, and spaced bridges beneath said plates for maintaining them in position, the arrangement including recesses located entirely within the confines of the element on which they are located whereby said plates are in engagement with one bridge and out of engagement with the other.

16. In a storage battery cell, the combination of a container, positive and negative plates therein, means whereby said plates are combined in the form of a unit, and spaced bridges in said container whereby said unit is maintained in position, the positive plate having a recess in registry with one bridge and the negative plate having a recess in registry with the other bridge whereby said plates have contact with one bridge but not with the other, said recesses being located entirely within the peripheries of said plates.

17. In a storage battery cell, the combination of a container, a group comprising positive and negative plates therein combined in the form of a unit, and a second group comprising spaced bridges in said container whereby said unit is maintained in position, one of said groups having seats and recesses, the seats and recesses of opposed members of said group being staggered with respect to each other whereby said plates have contact with one bridge but not with the other.

In witness whereof, I have hereunto subscribed my name.

CAMPBELL C. CARPENTER.